Figure 1:
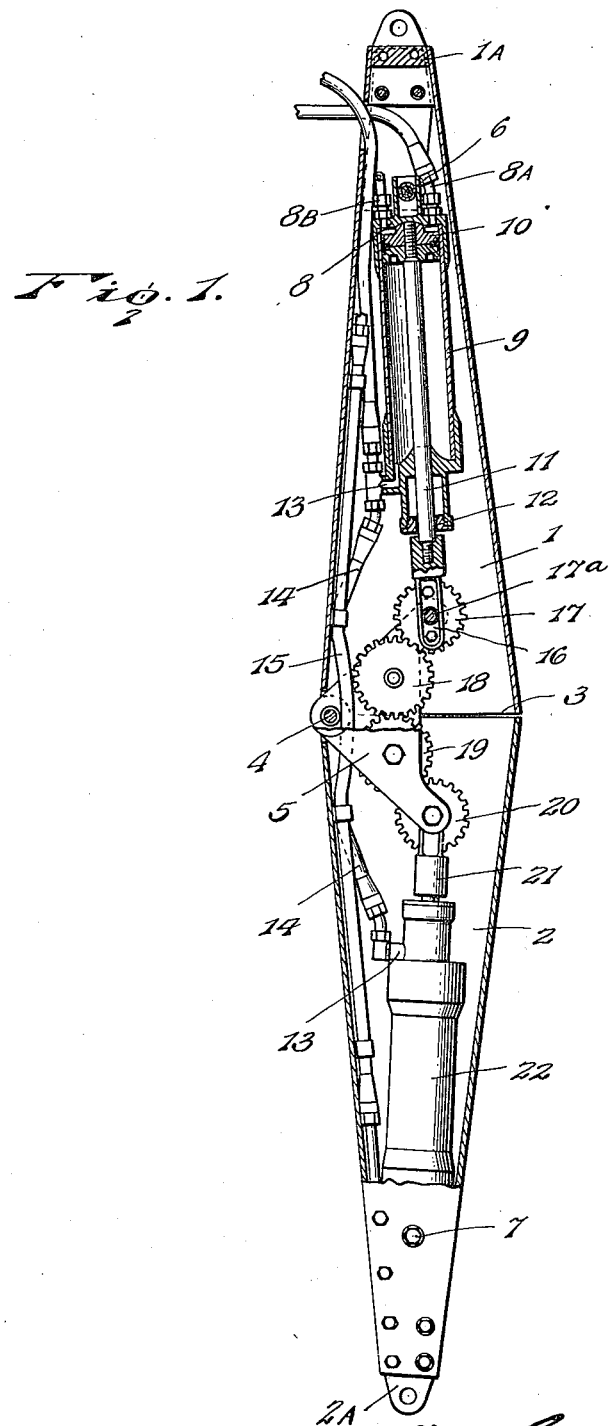

July 28, 1936.  G. H. DOWTY  2,049,109
AIRCRAFT UNDERCARRIAGE
Filed Nov. 20, 1935  2 Sheets-Sheet 1

Inventor
G. H. Dowty.
By
Lacey & Lacey,
Attorneys

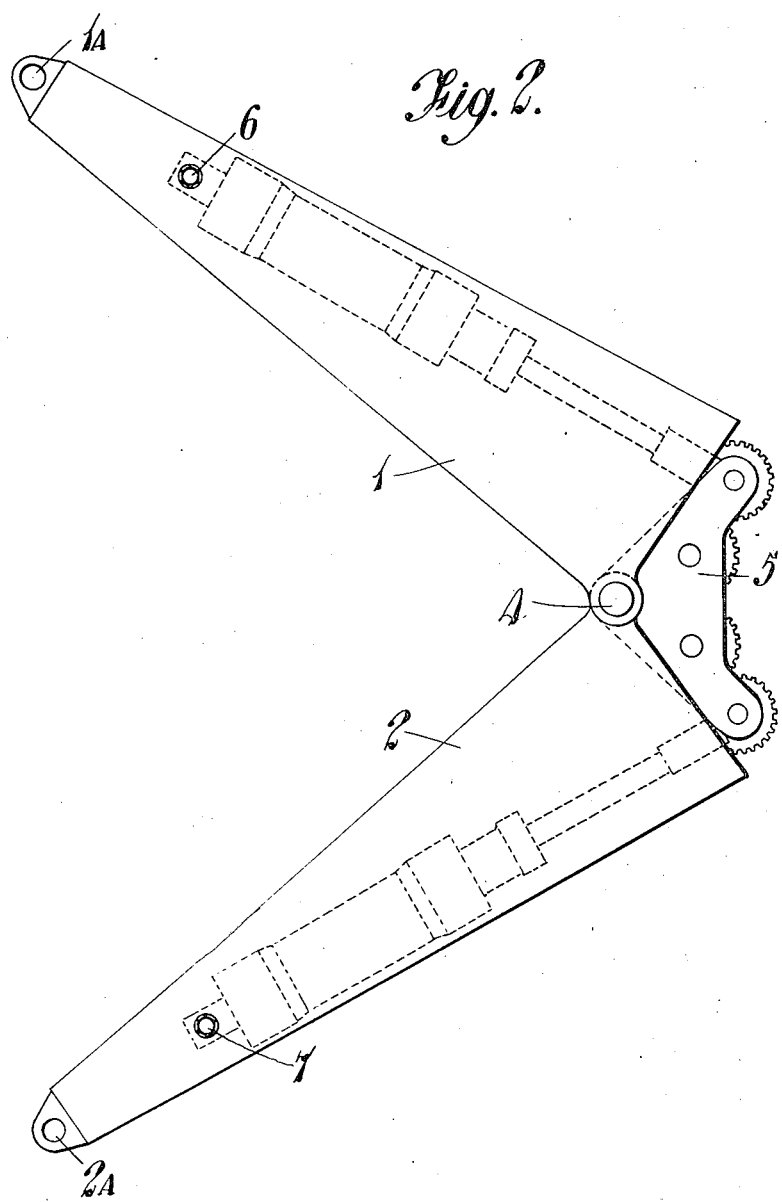

Patented July 28, 1936

REISSUED

FEB 25 1941

2,049,109

UNITED STATES PATENT OFFICE 2,049,109

AIRCRAFT UNDERCARRIAGE

George Herbert Dowty, Cheltenham, England

Application November 20, 1935, Serial No. 50,784
In Great Britain July 2, 1934

7 Claims. (Cl. 244—2)

This invention relates to aircraft undercarriages of the retractable type, or to tailwheels of like type, in which the wheels (or floats or skids) and their associated structure are adapted to be retracted towards or into the wings or fuselage, or points adjacent thereto. A primary object of the present invention is the provision of lifting means in the form of a self-contained unit attachable to the aeroplane by one or more pins or like fittings. The invention is more particularly applicable to that type of undercarriage in which one element, for example a strut, is, for the purpose of retraction, adapted to "break" about an axis of articulation between its ends, so that its overall length may in effect shorten. It may be desirable in some cases to provide such an element with means for breaking it or re-extending it, which does not require points of anchorage or of application of force external to the element; and means will for the purpose of convenience, be referred to as retracting gear, and it may comprise either a prime mover, or, as is preferred in the present case, some form of slave unit such as a jack system, or a mechanism adapted to be driven by an external source of power, by transmission which will be substantially unaffected by the movements of the element. A further object of the present invention is the provision of hydraulic means for retracting undercarriages, adapted to be carried by, and form part of, a strut. In the following description the action which is termed "breaking" is deemed to mean angular movement between two pivotally interconnected or articulated parts, about a centre which is disposed between their ends or points of pivotal attachment to the rest of the structure. In effect it means a sort of knuckle joint action.

According to the invention broadly stated, the retracting gear is carried wholly by the breakable element which it is to control, so that no external mechanism other than the source of energy or controlling gear, is required which can be substantially affected by the movements of the element. In a preferred form of the invention, as applied to a strut which is breakable, the two articulated units consist of two deformable triangular frames, and one side of each triangle is variable in length, for example by comprising wholly or in part a hydraulic jack. Further, according to the invention, a foldable strut for use with retraction gear for aircraft comprises mutually articulated elements and carries means for applying moments about the centre of articulation, the reaction of which means is taken by the strut itself without any external connections being necessary for the moment applying means. The invention therefore provides a strut element for retractable undercarriages comprising a structure with pivoted joint or joints between its attached ends, and means carried by the structure for applying a moment at the joint or joints for controlling the relative angular position of the articulated parts of the structure. By the employment of the above features it follows that an undercarriage can be retracted without the necessity for additional points of attachment, and without resort to means external to a foldable strut, except, perhaps, the provision of a prime mover or source of energy suitably connected. The invention also includes a construction of strut for retractable aircraft undercarriages in unit form, as will be described hereafter. The invention includes the use of purely mechanical jack retracting gear, driven from an external source, and arranged according to the foregoing statement.

A preferred form of the invention is illustrated diagrammatically in the accompanying drawings, in which:—

Figure 1 is a side elevation of the improved strut, parts being broken away and shown in section; and Figure 2 is a diagrammatic side elevation of the strut in a broken position.

In these figures the strut comprises two shell-like members or sections 1 and 2 of substantially triangular form adapted to meet on a common base line at 3. Towards the apices of these members 1 and 2 are fittings 1A and 2A adapted to be pivotally connected one to a suitable pin fitting on the aircraft, and the other to the axle or other lower part of an undercarriage to be retracted. The elements 1 and 2 are pivotally joined together by a pin or bolt 4 at the axis about which breaking is required. The bolt 4 also carries pivotally a bracket fitting 5 which is again of triangular form. The fitting 5 houses certain parts hereinafter described. Towards the outer ends of the elements 1 and 2 there are provided pins 6 and 7. It is unnecessary to reduplicate the description, so the following describes the parts appropriate to the member 1; the pin 6 carries with slight angular freedom the end fitting 8 which forms a cap for a hydraulic jack cylinder 9 in which there operates a jack piston 10 with a piston rod 11 protruding through the other end of the cylinder 9, with a suitable slide packing 12. In the cap member 8 there are two pipe connections 8A and 8B for the admission and emission of operative fluid under suitable control. The piston 10 is a double-acting piston, and the lower end of the cylinder 9 has an inlet passage at 13 connecting it with a pressure pipe 14. The precise nature of the hydraulic arrangement may be suitably varied and forms no part of the invention, but it may be mentioned that since an identical hydraulic jack is provided in the element 2 also, the pipelines such as 14 are suitably connected up with any necessary intermediate lengths of flexible pipe such as indicated at 15, to accommodate breaking of the strut and to allow the slight angular movements of the cylinder 9 for example about the pin 6. Ordinarily it is presumed that the two jacks are identical, and their connections are simple parallel connections. The outwardly projecting end of the piston rod 11 carries a fork fitting 16 carrying in turn a suitably journalled pinion 17 on an axis in the form of a pin 17A. The pinion 17 is rigid with the fork 16, but the fork and pinion are angularly movable about the pin 17A, which supports them in the fitting 5. The pinion 17 constantly meshes with an idle pinion 18, also carried rotatably by the bracket 5; pinion 18 in turn meshes with the like pinion 19, and the pinion 19 finally meshes with a pinion 20 which is attached to the external end of the piston rod 21 belonging to the other hydraulic jack, the cylinder of which is shown at 22. By virtue of this train of pinions it follows that any angular movement of the jack comprising the cylinder 9 and the rod 11 with respect to the fitting 5, necessarily entails like but opposite angular movement of the jack comprising the cylinder 22 and rod 21. Consequently any slight failure of one jack hydraulically, or lag as between one jack and the other, can be corrected by this positive train of engagement. It will be observed that on each side of the common base 3 a triangular structure is present; for example, in the element 1 there is a stress triangle comprising the hydraulic jack as a whole, the axes at 6 and 17A, the fitting 5 connecting the axis at 17A to the axis at 4, and the member 1 itself connecting the axis at 4 to the axis at 6. When the radius rod is fully extended as shown in Figure 1, it may be provided that the contacting edges at 3 of the shell parts 1 and 2 provide a sufficient abutment to take all compression loads between the fittings 1A and 2A, but if this is not convenient, the compression loads may be shared by the members of the triangle above described and the corresponding triangle in the element 2; this is especially so if (as shown in Figure 1) the parts 8, 10 come into mechanical abutment, whereby compression loads are transmitted through the triangles positively, and there need be no hydraulic pressure.

Figure 2 shows how the construction above described effects retraction. If liquid under pressure be introduced, for example, through the union 8A (and of course the corresponding union into cylinder 22) the piston rods 11 and 21 are forced outward from the cylinders, consequently applying a moment about the axis at 4, and it will be observed that there is no reaction external to the radius rod as a whole, in that the cylinder 9 acts on the pin at 6 and the rod 11 acts on the pin at 17A. When this takes place the side of the triangle 6/17A is elongated and therefore the member 1 moves angularly about the axis 4; simultaneously of course the member 2 moves symmetrically in opposite sense about the same axis, and the result of such movement is a position shown for example as in Figure 2. The decrease in distance between the fittings 1A and 2A in Figure 2 and compared with Figure 1, represents the degree of movement achieved towards retraction. For re-extension of the radius rod, pressure is applied to the jacks by the pipe 14, when the jacks are correspondingly contracted so that the construction returns to the position as shown in Figure 1.

Usually, when the strut is extended as in Figure 1, its external elements 1 and 2 will take the whole of the longitudinal stresses in it, but it may be arranged that these loads be shared, or taken wholly, through the jacks themselves.

In an alternative construction, not illustrated, only one jack is provided and employed, of which the cylinder is pivotally attached to the element 1 and the piston to the element 2, so that extension or contraction of this single jack produces articulate movement of the radius rod; the thrust line of the jack is for this purpose offset from the axis of articulation. Again, if it is not desired to harmonize the action of the two jacks above described positively, the train of pinions 17, 18, 19 and 20 may be omitted. In any case, however, it will be observed that the self-contained retracting gear of the radius rod applies moments for breaking it about its centre of articulation, and the reaction of such moments is taken within the radius rod itself; it will also be appreciated that the device above described comprises self-contained means within a breakable strut for controlling the relative angular positions of articulated parts thereof, that is to say the parts 1 and 2 as above described.

What I claim is:—

1. A strut comprising companion sections, a bracket between adjoining ends of said sections housed by the sections when the sections are in alinement, a pin pivotally connecting both sections with said bracket, and adjusting means for said sections consisting of cylinders extending longitudinally in said sections, pistons working in said cylinders and rods extending from said pistons out of the cylinders and pivoted to said bracket in offset relation to the pivotal connection of the sections with the bracket.

2. A strut comprising companion sections, a bracket between adjoining ends of said sections pivoted to the sections and having end portions extending into the sections when the sections are in axial alinement with each other, a cylinder extending longitudinally in each section and tiltable transversely of the section, and pistons slidable longitudinally in said cylinders having rods extending from the cylinders and pivoted to ends of said bracket.

3. A strut comprising companion sections, a bracket between adjoining ends of said sections pivoted to ends of the sections and having end portions projecting into the sections when the sections are in axial alinement with each other, a cylinder extending longitudinally in each section and mounted for tilting movement transversely of the section, a piston slidable longitudinally in each cylinder, rods extending from said pistons through ends of said cylinders and pivoted to ends of said bracket, and means for transmitting swinging movement from one piston rod and cylinder to the other piston rod and cylinder.

4. A strut comprising companion sections, a bracket between adjoining ends of said sections pivoted to ends of the sections and having end portions projecting into the sections when the sections are in axial alinement with each other, a cylinder extending longitudinally in each section and mounted for tilting movement transversely of the section, a piston slidable longitudinally in each cylinder, rods extending from said pistons through ends of the cylinders towards said bracket, pinions rotatably carried by ends of said bracket, the piston rods being secured to said pinions and extending radially therefrom, and idler pinions rotatably carried by said bracket and meshing with the first mentioned pinions and each other.

5. In an airplane undercarriage, a pair of sections having adjoining inner ends, a mounting for said sections having inner ends of the sections pivoted thereto intermediate ends of the mounting, cylinders extending longitudinally of said sections and having their outer ends pivoted to the sections for movement transversely thereof, pistons slidable in said cylinders and having rods projecting from inner ends of the cylinders, fluid pressure connections for said cylinders, and means pivotally connecting the piston rods with the ends of said mounting in offset relation to the pivotal connection between the mounting and the inner ends of the cylinders, said piston rods being shiftable by fluid pressure flowing through said connections into the cylinders for shifting the sections with respect to each other.

6. A strut comprising companion sections having inner ends adjacent each other, a mounting pivotally connected intermediate its length to inner ends of the sections, and adjusting means for said sections consisting of cylinders extending longitudinally of the sections and having their outer ends pivotally connected with the sections, and pistons slidable in said cylinders and having rods extending from inner ends of the cylinders and pivoted to ends of said mountings in offset relation to opposite sides of the plane of the pivotal connection of the sections with the mounting.

7. A strut comprising companion sections, a mounting between adjoining ends of the sections pivoted intermediate its length to ends of the sections, and a hydraulic jack including a cylinder extending longitudinally of each section, a piston slidable longitudinally in each cylinder and having a rod extending from one end of the cylinder, one end of the hydraulic jack being pivotally connected to the section and the other end being pivotally connected to the mounting in offset relation to opposite sides of the plane of the pivotal connection of the sections with the mounting.

GEORGE HERBERT DOWTY.